(12) United States Patent
Heinrichs et al.

(10) Patent No.: US 10,221,626 B2
(45) Date of Patent: Mar. 5, 2019

(54) TOP DRIVE FOR A DRILL STRING

(71) Applicant: MHWIRTH GMBH, Erkelenz (DE)

(72) Inventors: Albrecht Heinrichs, Erkelenz (DE); Achim Feldermann, Aachen (DE); Sebastian Leier, Schmallenberg (DE); Thomas Dolls, Heinsberg (DE)

(73) Assignee: MHWIRTH GMBH, Erkelenz (DE)

( * ) Notice: Subject to any disclaimer, the term of this patent is extended or adjusted under 35 U.S.C. 154(b) by 624 days.

(21) Appl. No.: 14/777,746

(22) PCT Filed: Mar. 7, 2014

(86) PCT No.: PCT/EP2014/054420
§ 371 (c)(1),
(2) Date: Sep. 17, 2015

(87) PCT Pub. No.: WO2014/146910
PCT Pub. Date: Sep. 25, 2014

(65) Prior Publication Data
US 2016/0290045 A1    Oct. 6, 2016

(30) Foreign Application Priority Data

Mar. 19, 2013 (DE) .................. 10 2013 102 805

(51) Int. Cl.
*E21B 3/02* (2006.01)
*F16C 19/30* (2006.01)
(Continued)

(52) U.S. Cl.
CPC ............. *E21B 3/02* (2013.01); *E21B 19/00* (2013.01); *F16C 19/30* (2013.01); *F16C 19/56* (2013.01); *F16C 2352/00* (2013.01)

(58) Field of Classification Search
CPC .. E21B 3/02; E21B 19/00; F16C 19/30; F16C 19/56; F16C 2352/00; F16C 35/06; F16C 35/067; F16C 35/078; F16C 35/12
(Continued)

(56) References Cited

U.S. PATENT DOCUMENTS 2,959,159 A * 11/1960 McCrory ................ F02B 71/04
123/46 SC
4,449,596 A    5/1984 Boyadjieff
(Continued)

FOREIGN PATENT DOCUMENTS

CN    101018925 A    8/2007
CN    101317313 A    12/2008
(Continued)

*Primary Examiner* — Gloria R Weeks
(74) *Attorney, Agent, or Firm* — Norman B. Thot (57) ABSTRACT

The top drive comprises a gear unit, a main spindle, and an active pressure generating device. The gear unit comprises a gear housing, an axial main bearing, and an axial auxiliary bearing. The axial main bearing comprises an upper main bearing part with rotates relative to the lower main bearing part. The lower main bearing part contacts the gear housing. The axial auxiliary bearing comprises an upper auxiliary bearing part which rotates relative to the lower auxiliary bearing part and contacts the gear housing. The main spindle rotates within the gear unit and contacts the upper main bearing part. The active pressure generating device is arranged between the upper auxiliary bearing part and the gear housing, the lower auxiliary bearing part and the main spindle, the lower main bearing part and the gear housing, and/or the upper main bearing part and the main spindle.

8 Claims, 7 Drawing Sheets (51) Int. Cl.
*F16C 19/56* (2006.01)
*E21B 19/00* (2006.01)

(58) Field of Classification Search
USPC ...... 173/1, 53, 164, 184, 216; 384/440, 484, 384/510, 548, 559, 564, 571, 572
See application file for complete search history.

(56) References Cited

U.S. PATENT DOCUMENTS

| | | | |
|---|---|---|---|
| 4,529,045 A | 7/1985 | Boyadjieff et al. | |
| 4,668,105 A * | 5/1987 | Furukawa | F01D 25/164 384/535 |
| 4,850,719 A * | 7/1989 | Moseley | F16C 19/184 384/1 |
| 4,997,292 A | 3/1991 | Klimkovsky et al. | |
| 5,238,308 A * | 8/1993 | Lang | F16C 25/02 277/411 |
| 5,316,391 A * | 5/1994 | Monzel | F16F 1/32 384/99 |
| 5,447,375 A * | 9/1995 | Ochiai | F16C 32/0644 384/100 |
| 6,394,657 B1 * | 5/2002 | Takamizawa | F16C 19/08 384/512 |
| 6,422,757 B1 * | 7/2002 | Wu | F16C 25/08 384/1 |
| 6,582,125 B1 * | 6/2003 | Lee | F16C 17/024 384/103 |
| 6,695,071 B1 | 2/2004 | DeVall | |
| 8,393,393 B2 * | 3/2013 | Rodgers | E21B 43/1195 102/302 |
| 2005/0269104 A1 | 12/2005 | Folk et al. | |
| 2006/0023985 A1 * | 2/2006 | Gradu | B60B 27/00 384/563 |
| 2006/0140527 A1 * | 6/2006 | Takamizawa | F16C 19/30 384/620 |
| 2006/0257062 A1 * | 11/2006 | Kitaoka | F16C 33/6674 384/474 |
| 2007/0163784 A1 | 7/2007 | Bailey et al. | |
| 2007/0251699 A1 | 11/2007 | Wells et al. | |
| 2007/0296308 A1 * | 12/2007 | Yamamoto | H02N 2/025 310/328 |
| 2009/0159271 A1 | 6/2009 | De Jong et al. | |
| 2011/0002566 A1 * | 1/2011 | Sun | F16C 39/066 384/446 |
| 2011/0299802 A1 | 12/2011 | West | |
| 2013/0284459 A1 * | 10/2013 | Weintraub | E21B 3/02 166/380 |
| 2014/0105524 A1 * | 4/2014 | Mueller | H02K 7/081 384/91 |
| 2015/0043858 A1 * | 2/2015 | Aust | F16C 25/08 384/558 |

FOREIGN PATENT DOCUMENTS

| | | |
|---|---|---|
| CN | 101432498 A | 5/2009 |
| CN | 201588532 U | 9/2010 |
| CN | 102037206 A | 4/2011 |
| CN | 201891380 U | 7/2011 |
| CN | 102373879 A | 3/2012 |
| CN | 202578490 U | 12/2012 |
| CN | 202745683 U | 2/2013 |
| DE | 10 2011 080 651 A1 | 2/2013 |
| EP | 0 392 013 A1 | 10/1990 |
| RU | 2 027 846 C1 | 1/1995 |
| RU | 55846 U1 | 8/2006 |

* cited by examiner

TOP DRIVE FOR A DRILL STRING

CROSS REFERENCE TO PRIOR APPLICATIONS

This application is a U.S. National Phase application under 35 U.S.C. § 371 of International Application No. PCT/EP2014/054420, filed on Mar. 7, 2014 and which claims benefit to German Patent Application No. 10 2013 102 805.5, filed on Mar. 19, 2013. The International Application was published in German on Sep. 25, 2014 as WO 2014/146910 A2 under PCT Article 21(2).

FIELD

The present invention relates to a top drive for a drill string, comprising a gear unit having a gear housing, comprising a main spindle mounted rotatably about an axis of rotation within the gear unit to which the drill string can be coupled, wherein the gear unit comprises an axial main bearing having a lower main bearing part and an upper main bearing part, the upper main bearing part being rotatable about the axis of rotation relative to the lower main bearing part, wherein the main spindle indirectly or directly contacts the upper main bearing part and the lower main bearing part indirectly or directly contacts the gear housing, and wherein the gear unit comprises an axial auxiliary bearing having a lower auxiliary bearing part and an upper auxiliary bearing part, the upper auxiliary bearing part being rotatable about the axis of rotation relative to the lower auxiliary bearing part, wherein the lower auxiliary bearing part indirectly or directly contacts the main spindle and the upper auxiliary bearing part indirectly or directly contacts the gear housing.

BACKGROUND

Such top drives provide for, inter alia, the rotary drive and the lowering and raising of the drill string. For this purpose, the drill string is coupled in a rotationally fixed manner with the main spindle, usually via a screw connection. The top drive is guided in a mast with the aid of a guide carriage during operation. Reaction moments are introduced into the mast during operation via the guide carriage.

Lowering and raising of the top drive, and thus the drill string, is usually provided by a pulley arrangement which is held at the upper end of the mast and connected, for example, via a mounting bracket, with the top drive.

For rotary actuation of the main spindle, the gear unit is connected with at least one electrically or hydraulically driven rotary motor.

Due to the fixed connection of the drill string with the main spindle, high demands are made on the bearing thereof in the gear housing of the gear unit of the top drive. An axial bearing must in particular be provided for the main spindle, the axial bearing being suitable to introduce the mass which is present in a drill string with a working head into the housing. The axial bearing must also permanently withstand the dynamic loads that occur during a drilling operation.

The axial bearing of the main spindle comprises an axial main bearing in a top drive of known construction. It is formed as a conical roller bearing. Its lower main bearing part abuts the housing. The main spindle is supported with a radial flange on its upper main bearing part.

In order to achieve a long service life of the axial bearing, play between the bearing rollers and the upper and lower bearing parts is to be avoided. A spring unit is provided for this purpose in known top drives, the spring unit pressing the upper auxiliary bearing part onto the rolling elements.

It has been shown, however, that in spite of the preloading which acts in this way, the axial main bearing may be subject to unexpectedly high wear and tear, in particular when drilling under pressure. The spring assemblies are hereby pressed together. Bearing play is present in the lower bearing. It is thus not provided that the rollers of the main bearing roll evenly.

SUMMARY

An aspect of the present invention is to develop a generic top drive which reduces wear and tear on the axial bearing and which has a longer service life.

In an embodiment, the present invention provides a top drive for a drill string. The top drive comprises a gear unit, a main spindle, and an active pressure generating device. The gear unit comprises a gear housing, an axial main bearing, and an axial auxiliary bearing. The axial main bearing comprises a lower main bearing part and an upper main bearing part. The upper main bearing part is configured to rotate about an axis of rotation relative to the lower main bearing part. The lower main bearing part is configured to indirectly or directly contact the gear housing. The axial auxiliary bearing comprises a lower auxiliary bearing part and an upper auxiliary bearing part. The upper auxiliary bearing part is configured to rotate about the axis of rotation relative to the lower auxiliary bearing part and to indirectly or directly contact the gear housing. The main spindle is mounted so as to rotate about the axis of rotation within the gear unit. The main spindle is configured to indirectly or directly contact the upper main bearing part. The drill string is arranged to couple to the main spindle. The lower auxiliary bearing part is configured to indirectly or directly contact the main spindle. The active pressure generating device is arranged between at least one of, the upper auxiliary bearing part and the gear housing, the lower auxiliary bearing part and the main spindle, the lower main bearing part and the gear housing, and the upper main bearing part and the main spindle.

BRIEF DESCRIPTION OF THE DRAWINGS

The present invention is described in greater detail below on the basis of embodiments and of the drawings in which.

DETAILED DESCRIPTION

In the top drive according to the present invention, an active pressure generating device is provided between the upper auxiliary bearing part and the gear housing and/or between the lower auxiliary bearing part and the main spindle and/or between the lower main bearing part and the gear housing and/or the upper main bearing part and the main spindle. The arrangement of the active pressure generating device between the upper auxiliary bearing part and the gear housing is preferred.

"Active pressure generating device" means a pressure generating device via which a pressure can be exerted which is variable and thus adjustable to different operating conditions. Because of the development of the top drive according to the present invention, it is thus possible to adjust the preloading under which the axial main bearing and the auxiliary bearing are operated to different operating conditions. The preloading may, for example, be set depending on the speed of rotation or tensile or compressive forces acting on the main spindle so that the axial main bearing and the auxiliary bearing are operated at least under nearly optimal (pressure) conditions. Tolerances may additionally be equalized without the use of shims or the like. Maintenance and installation of the axial main bearing are also simplified because an open space within the gear housing can be created through the unpressurized setting of the pressure generating device. The active pressure generating device may be provided instead of a spring assembly. Retrofitting to existing top drives is thus possible.

In an embodiment of the present invention, the active pressure generating device can, for example, comprise a piston which is pressurizable with hydraulic or pneumatic pressure. A piston which is pressurizable with hydraulic pressure can, for example, be provided as this is permanently available for driving the motor of the top drive and/or other components of a drilling device in which a top drive is used.

In an embodiment of the present invention, the piston can, for example, be an annular piston which acts on the upper auxiliary bearing part. For the actuation thereof, it is sufficient to provide a single channel which opens out into the annular space in which the annular piston is mounted.

In an embodiment of the present invention, a plurality of cylindrical pistons can, for example, be provided which act upon the upper auxiliary bearing part. Although this embodiment is costlier due to the plurality of components and the necessary plurality of channels opening into the individual cylinders for each respective piston, it is nevertheless advantageous that any inclinations of the upper auxiliary bearing part and/or the housing from an exactly parallel position to one another can be automatically compensated which, in the case of an annular piston, could lead to the tilting thereof in the annular space.

In an embodiment of the top drive according to the present invention, the active pressure generating device can, for example, comprise at least one piezoelectric element. The axial main bearing which produces the preloading can then be adjusted through variation of the level of voltage applied to the piezoelectric element to the respective operating condition in which a drilling device comprising a top drive is located. Such an embodiment of the pressure generating device can, for example, be provided in particular if the top drive comprises an electrically powered drive motor.

Regardless of whether the pressure generating device is operated hydraulically, pneumatically, piezoelectrically, or in yet another manner, a pressure control device can, for example, be provided via which the pressure created by the active pressure generating device can also be changed during operation of the top drive. Due to this measure, the preloading of the main axial bearing can be adjusted to different operating conditions without necessitating an interruption of the operation of the top drive for this purpose. The following varying operating conditions are conceivable which, for the purpose of reducing wear and tear and increasing the service life of the main axial bearing, require the alteration of the pressure exerted by the pressure generating device:

1. Exerting a slight pressure to create a slight preloading during transport and storage of the top drive. The pressure is set to the lowest possible level sufficient to avoid movements in the main axial bearing which could lead to bearing damage. In the case of a hydraulic or pneumatic actuation of the pressure generating device, this pressure can be maintained by a pressure accumulator connected during transport and storage of the top drive. If the pressure generating device comprises one (or more) piezoelectric elements, a voltage source, such as a battery, may then be put to use.
2. Another contact pressure which is regularly higher than the contact pressure during transport or storage can be chosen when the drilling device comprising the top drive according to the present invention is in "normal" drilling operation. Hereby is in particular meant that drilling operation wherein, in spite of the advancement through lowering of the top drive, the drill string hangs on the main spindle. The pressure produced by the pressure generating device is then set via the applied hydraulic or pneumatic pressure or the applied electrical current so that, according to experience, the dynamic loads acting on the main spindle in normal operation do not lead to damaging movements in the bearing.
3. If the sinking of the drill is inhibited, for example, by unexpected hard rock in the ground, this may cause the drill string to no longer hang on the main spindle, but rather the top drive to exert pressure on the drill string via the main spindle. In this case, the pressure generated by the pressure generating device is raised through an increase in the applied hydraulic or pneumatic pressure or the applied current to such a level that the pressure force pressing downward with the aid of the axial auxiliary bearing of the main spindle is greater than the pressure force with which the top drive presses the main spindle downward. Harmful play in the bearing is thereby reliably prevented.
4. Special pressure peaks between the top drive and the drill string can be expected in a so-called "jarring operation." This mode of operation can be selected if the drill string is outfitted with a so-called "bumper jar." With the help of this bumper jar, the lower end of an upper part of the drill string can be selectively clamped or released relative to a lower part of the drill string. The lower and the upper part of the drill string are then configured so that a stop is formed between these two parts. In the event that the lower part of the drill string or a drilling tool attached thereto becomes jammed in the bore, the drill string can be placed under tension via the top drive. After releasing the bumper jar, the lower end of the upper part of the drill string rises rapidly up to the stop, and thereby exerts a striking force on the lower part of the drill string and a drilling tool which is possibly affixed thereto, through which the drill string or the drilling tool is released. As a result, large dynamic forces may arise in the axial main bearing, especially those which can lead to a lifting and subsequent colliding of the bearing parts. A jarring operation is therefore always to be avoided. If, however, this becomes inevitable due to unforeseen jamming, the maximum allowable preloading may thus be created in the axial main bearing by the top drive according to the present invention with the aid of the pressure generating device in order to reduce the danger of damage to the lowest technically possible minimum.

In addition to providing a pressure control device, via which the pressure generated by the active pressure generating device is adjustable to different operating conditions, it is likewise possible to provide a pressure regulation device via which the pressure generated by the active pressure generating device is regulated depending on the force acting on the main spindle in the direction of the axis of rotation. For this purpose, force transducers may be provided in the main spindle, in the drill string and/or also on drilling tools provided on the drill string, the force transducers detecting the direction and magnitude of forces acting on the main spindle. Still more operating variables can be detected, such as the speed of rotation with which the main spindle is operated, and the rotational torque which is transferred via the main spindle. A regulation device can then, for example, regulate the pressure generated by the active pressure generating device as a function of the detected values according to a predetermined dependence so that movement in the axial main bearing is not to be expected, however, an excessive pressure load of the components of the axial main bearing is avoided by a high preloading.

The present invention will now be explained in more detail with reference to the accompanying drawings.

Figure 1:
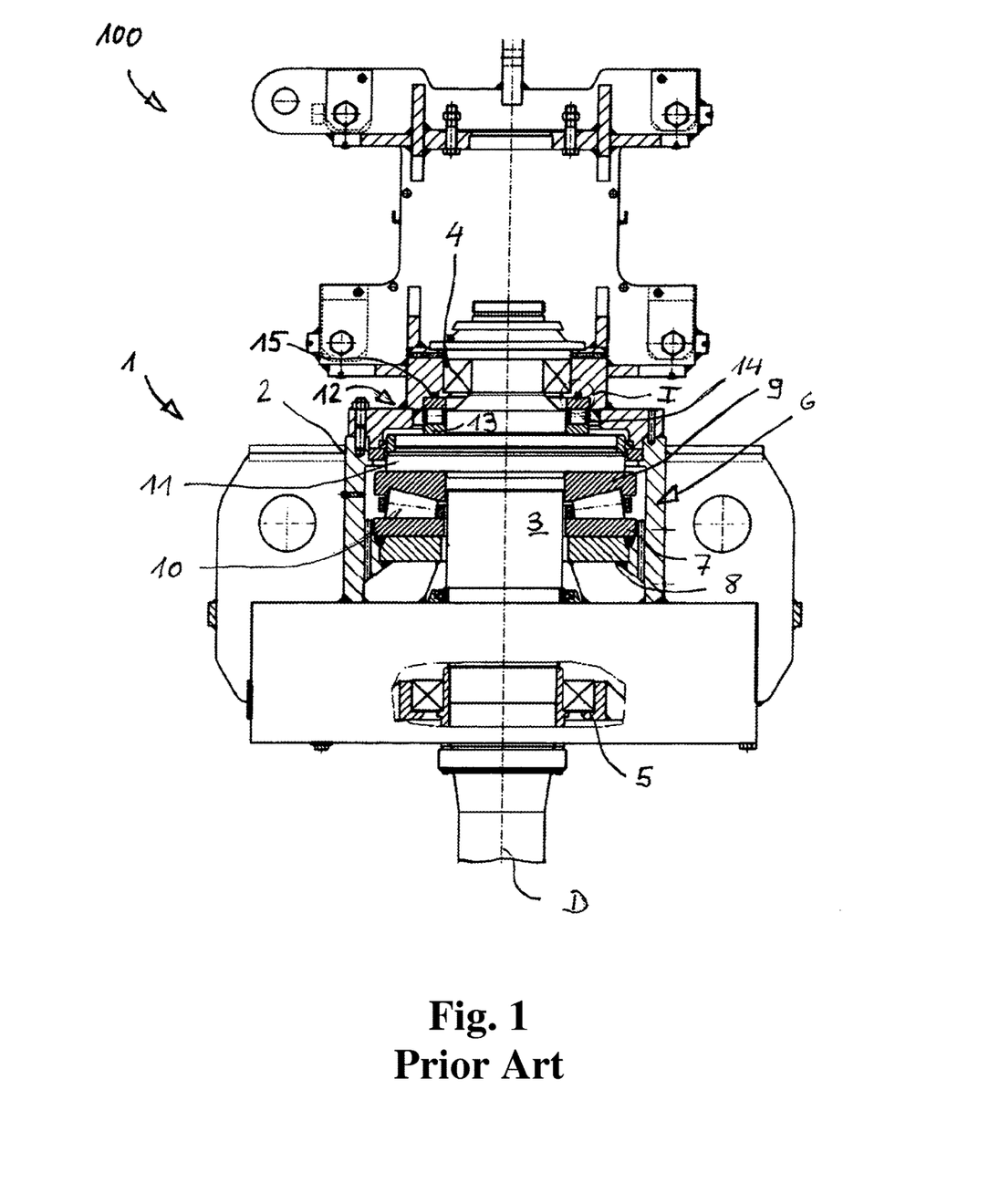
FIG. 1 shows a top drive typical of that belonging to the prior art in a partially sectioned side view (view perpendicular to the axis of rotation of the main spindle)
Figure 2:
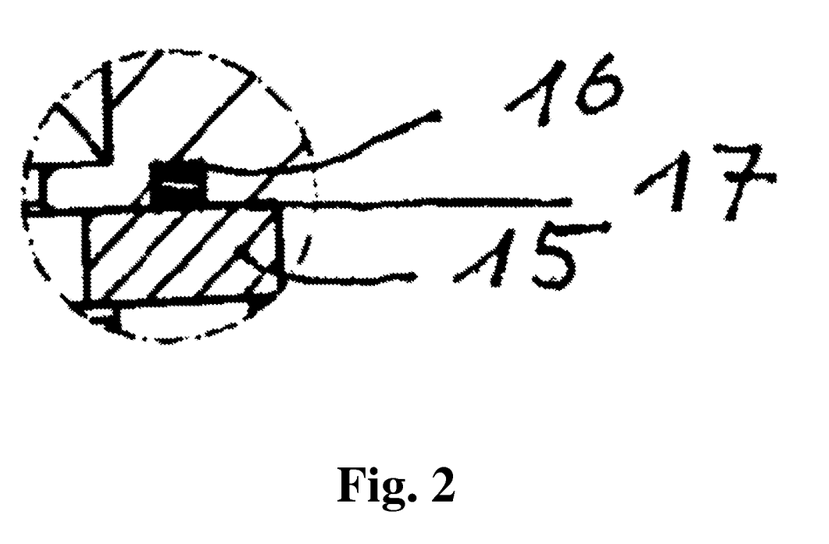
FIG. 2 shows the detail I in FIG. 1 in an enlarged view.

In FIG. 1, the top drive designated as a whole as 100 comprises a gear unit 1, which has a gear housing 2. In the gear housing 2, a main spindle 3 is mounted rotatably about an axis of rotation D. The main spindle 3 provides an externally toothed spur gear (not shown in the drawings as it is covered by parts of the gear housing) on which spur gear is coupled a typically hydraulically or electrically driven drive motor (also not shown in the drawings).

The main spindle 3 is radially mounted in the gear housing 2 by an upper radial bearing 4 and by a lower radial bearing 5. An axial main bearing 6 is provided between the upper radial bearing 4 and the lower radial bearing 5. The axial main bearing 6 comprises a lower main bearing part 7 which rests on a flange 8 of the gear housing 2. The axial main bearing 6 further comprises an upper main bearing part 9, which is supported on the lower main bearing part 7 via conical rollers 10.

The main spindle 3 abuts the upper main bearing part 9 with a radial flange 11. It is thus secured from below against displacement with the aid of the axial main bearing 6 according to FIG. 1.

As can be seen in FIG. 1, the axial main bearing 6 has large dimensions compared to the other bearings because, in operation, it must in particular capture the weight force of the drill string connected with the main spindle 3 (not shown in the drawings).

In order to also hold the main spindle 3 in an axial position against possible forces acting from below during operation according to FIG. 1, or during storage or during transport while not in the operating position of the top drive, an axial auxiliary bearing 12 is provided. The axial auxiliary bearing 12 comprises a lower auxiliary bearing part 13 which is supported from above by the radial flange 11. An upper auxiliary bearing part 15 is supported via bearing rollers 14 on the lower auxiliary bearing part 15. The upper auxiliary bearing part 15 is mounted in the gear housing 2. Between the upper auxiliary bearing part 15 and the gear housing 2 and/or between the lower auxiliary bearing part 13 and the radial flange 11, spacers (which are not shown in the drawings) may be provided to compensate at least coarse tolerances.

In order to prevent the axial bearing assembly, which comprises the axial main bearing 6 and the axial auxiliary bearing 12, from having axial play, which is brought about by thermally induced changes in steering, wear and tear, etc., for example, through small tolerances, which can lead to a drastic increase in wear and tear and an associated reduction in service life, the upper auxiliary bearing part 15 of the axial auxiliary bearing 12 is preloaded below by means of a spring assembly 17 arranged in bores 16 according to FIG. 1. The main spindle 3 is thus pressed downward under the spring force created by the spring assembly 17.

Figure 3:
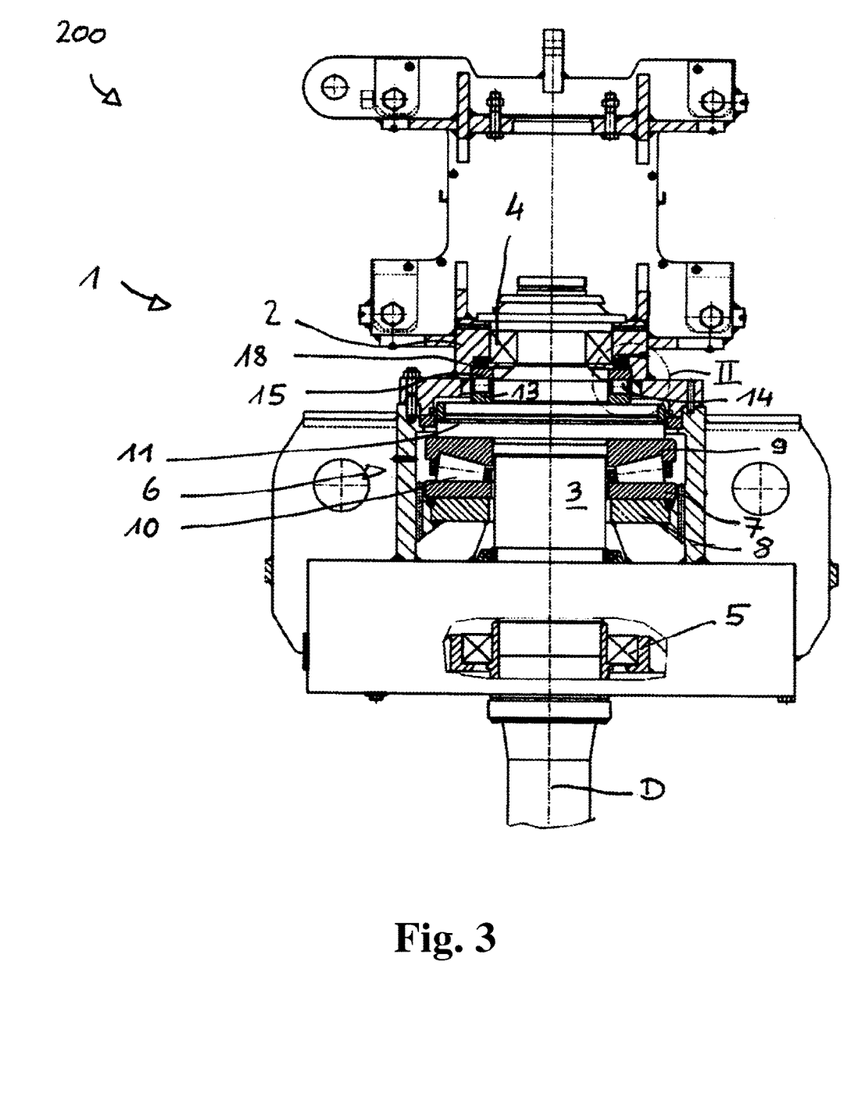
FIG. 3 shows a first embodiment of a top drive according to the present invention in a representation corresponding to FIG. 1.
Figure 6:
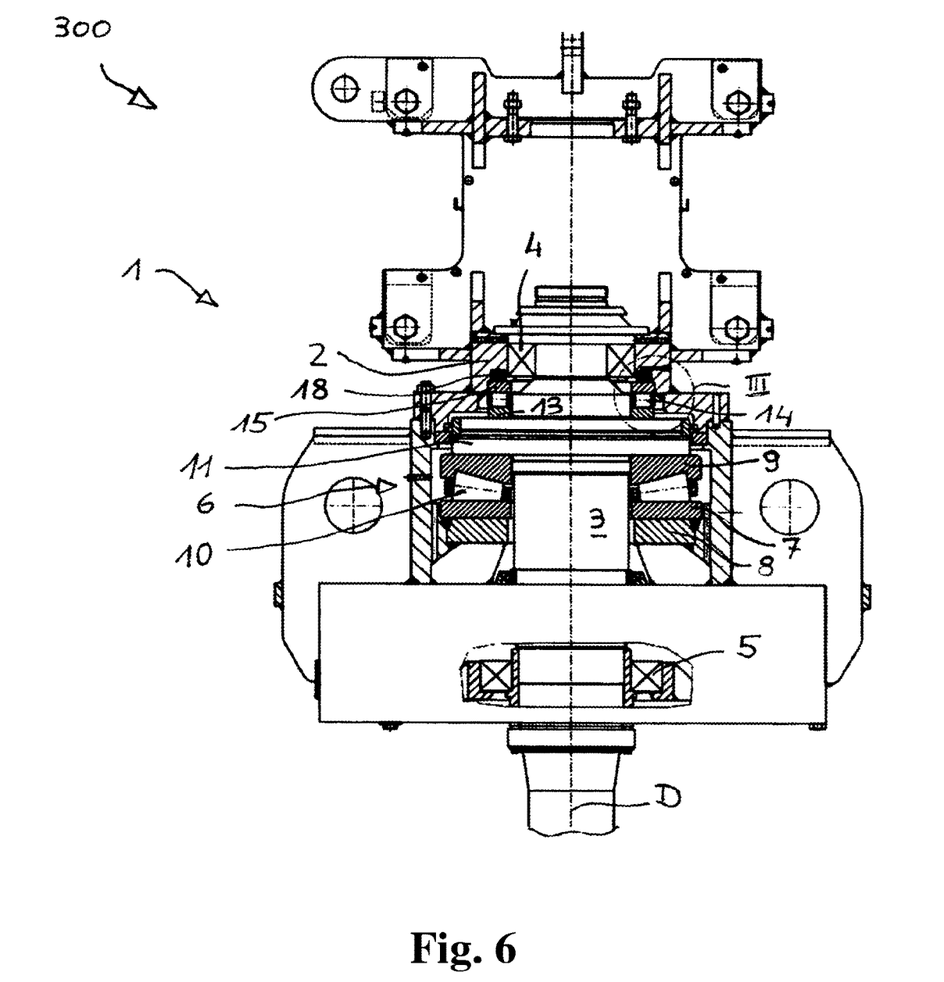
FIG. 6 shows a second embodiment of the top drive according to the present invention in a view corresponding to FIG. 2.

FIGS. 3 and 6 show two embodiments of the development according to the present invention of the generic top drive 100 described with reference to FIG. 1. For the purpose of avoiding repetition, corresponding components of FIGS. 3 and 6 are provided with the same reference characters as in FIG. 1. Reference is made in this regard to FIG. 1.

The top drive shown in FIG. 3, which is now designated as a whole as 200, comprises an active pressure generating device 18, which is provided between the upper auxiliary bearing part 15 and the gear housing 2 instead of the spring assembly 17.

Figure 4:
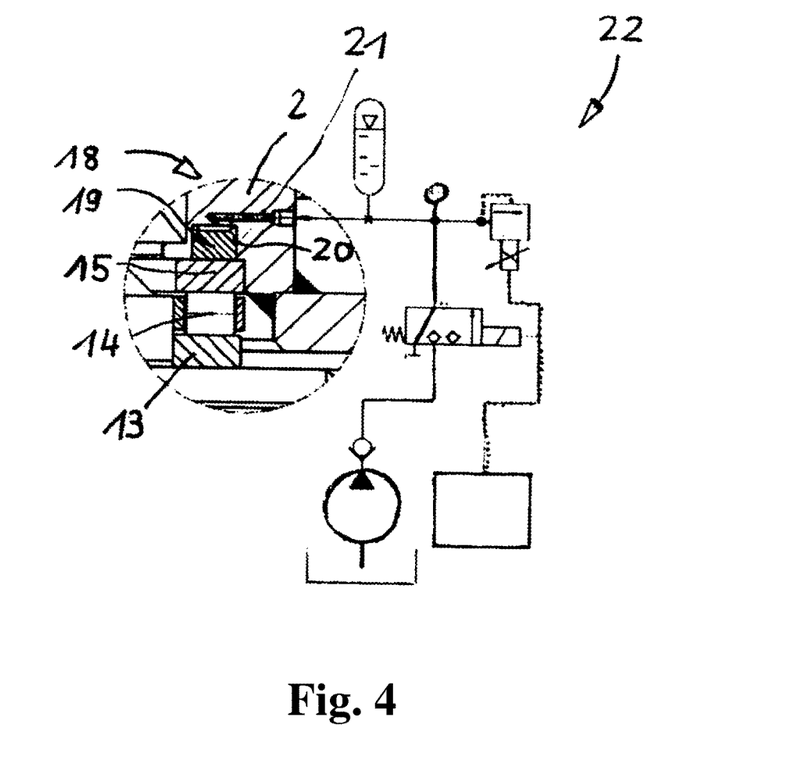
FIG. 4 shows the detail II in FIG. 3 with a hydraulic block diagram.
Figure 5:
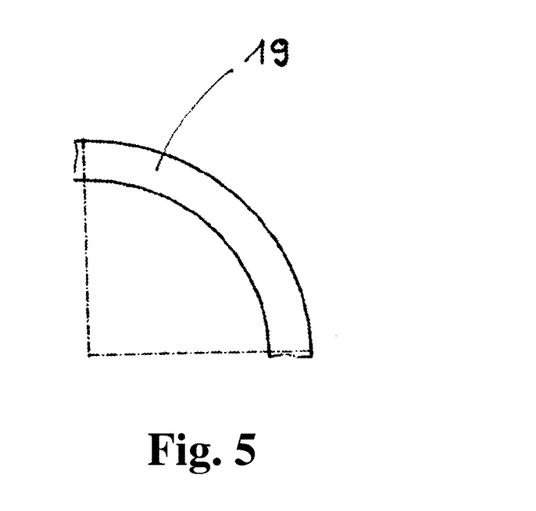
FIG. 5 shows an individual representation of a piston of the active pressure generating device in a view according to FIG. 3 from above.

In the embodiments illustrated in FIGS. 3, 4 and 5, the active pressure generating device comprises an annular piston 19, which is laterally sealingly mounted therewith in an annular groove 20 provided in the gear housing 2.

In the base of the annular groove 20, a channel 21 opens via which pressurized hydraulic medium is supplied and thus the annular piston 19, depending on the pressure of the supplied hydraulic medium, can be pressed with varying force from above against the upper auxiliary bearing part 15. The pressure can, for example, be selected so that the axial main bearing 6 operates under the most optimal conditions possible.

Figure 7:
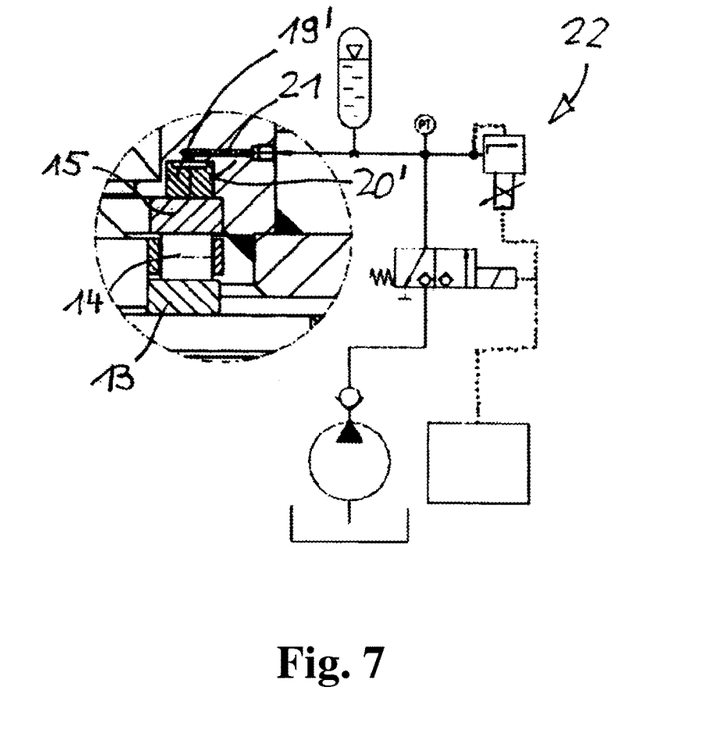
FIG. 7 shows the detail III in FIG. 6 together with a hydraulic block diagram.
Figure 8:
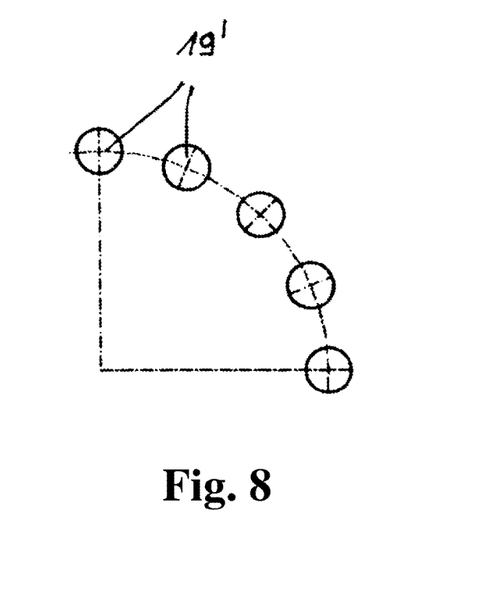
FIG. 8 shows an individual representation of a number of pistons of the active pressure generating device in a view according to FIG. 6 from above.

In the embodiment 300 shown in FIGS. 6, 7 and 8, a plurality of cylindrical pistons 19' which act on the upper auxiliary bearing part 15 from above are used instead of the annular piston 19. The pistons 19' are mounted in cylinders 20', which are fluidically connected to one another, so that all pistons 19' are acted upon by the same hydraulic pressure.

If the operation is to take place electrically, other active pressure generating devices, for example piezoelectric elements, may also be used instead of the pistons 19'.

The provision of the hydraulic medium takes place by a hydraulic device 22, whose design and function will be described below with reference to FIG. 9.

The hydraulic device 22 comprises a tank 23 for the hydraulic fluid and a hydraulic pump with a non-return valve downstream from the tank 23. The tank 23 and the hydraulic pump with the non-return valve 24 may belong to a hydraulic power unit which provides the hydraulic liquid necessary for the operation of a drilling system to which the top drive 200, 300 according to the present invention belongs.

A spring force activated and electrically switchable switching valve 26 is connected to the hydraulic pump with the non-return valve 24 via a hydraulic line 25. The switching valve 26 is connected to the channel 21 via a hydraulic line 27. A hydraulic accumulator with a gas chuck 28, a pressure gauge 29 and an electrically regulatable overpressure valve 30 are connected to the hydraulic line 27.

The switching valve 26 and the overpressure valve 30 are electrically connected to a control or regulation device 31.

Figure 9:
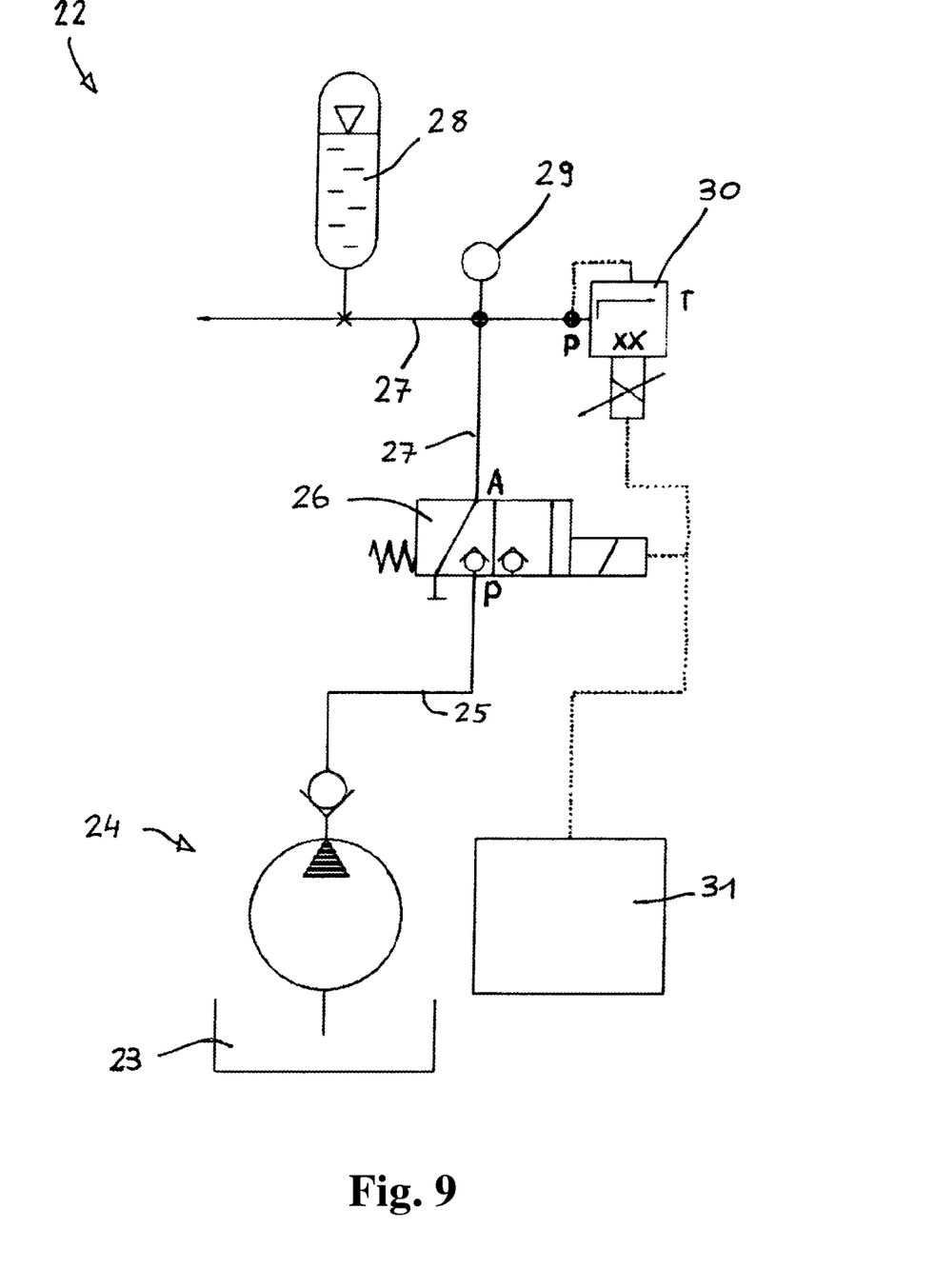
FIG. 9 shows an enlarged view of the hydraulic block diagram.

FIG. 9 shows the hydraulic device in a state in which the active pressure generating device 18 is separated from the hydraulic pump 24. For this purpose, the hydraulic lines 25 and 27 are shut off by the switching valve 26. The pressure determined through the hydraulic accumulator 28 is applied in the hydraulic line 27.

For generating the preloading in the axial main bearing 6, the switching valve 26 and the overpressure valve 30 are acted upon by the control or regulation device 31 with an electric signal, which is a measure for the desired pressure value to be generated by the active pressure generating device 18. Via this electric signal, the switching valve 26 is first switched so that the hydraulic line 27 is connected with the hydraulic line 25 and thus the channel 21 is acted upon with hydraulic pressure provided by the hydraulic pump 24. If the hydraulic pressure corresponding to the electric signal provided by the control or regulation device 18 is reached, the overpressure valve 30 opens. If the pressure falls below the desired value, the overpressure valve 30 closes. The pressure predetermined by the control or regulation device 31 is thus applied to the active pressure generating device 18, whereby potential pressure fluctuations are smoothed by the hydraulic accumulator 28. Possible losses of hydraulic fluid through leakage can also be smoothed up to an extent limited by the volume of the hydraulic accumulator 28.

The control or regulation device 31 may be configured for a manual entry of a desired pressure value. This is then strictly speaking a control device. It is, however, likewise possible to form the control or regulation device 31 as a regulation device in a stricter sense. It then comprises an additional signal input, against which is applied force values, for example, those acting on the main spindle 3 in the direction of the axis of rotation, which are recorded by suitable sensors. Via an algorithm stored in the control or regulation device 31, the switching valve 26 and the overpressure valve 30 are then actuated so that a pressure is provided in the hydraulic line 27 as is needed to generate the preloading of the axial main bearing 6 which is optimal for the respective operating condition.

If, instead of this or the piston 19, 19', piezoelectric elements are provided, the output of the control or regulation device 31 may be directly connected with the piezoelectric elements, provided that the control or regulation device 31 is adapted to the piezoelectric elements with respect to the electrical values generated at the output.

The present invention is not limited to embodiments described herein; reference should be had to the appended claims.

LIST OF REFERENCE CHARACTERS

100, 200, 300 top drive
1 gear unit
2 gear housing
3 main spindle
4 upper radial bearing
5 lower radial bearing
6 axial main bearing
7 lower main bearing part
8 flange
9 upper main bearing part
10 conical rollers
11 radial flange
12 axial auxiliary bearing
13 lower auxiliary bearing part
14 bearing rollers
15 upper auxiliary bearing part
16 bores
17 spring assembly
18 active pressure generating device
19 annular piston
19' cylindrical piston
20 annular groove
20' cylinder
21 channel
22 hydraulic device
23 tank
24 hydraulic pump non-return valve
25 hydraulic line
26 switching valve
27 hydraulic line
28 hydraulic accumulator
29 pressure gauge
30 overpressure valve
31 control or regulation device
D axis of rotation

What is claimed is:

1. A top drive for a drill string, the top drive comprising:
    a gear unit comprising,
        a gear housing,
        an axial main bearing comprising a lower main bearing part and an upper main bearing part, the upper main bearing part being configured to rotate about an axis of rotation relative to the lower main bearing part, the lower main bearing part being configured to indirectly or directly contact the gear housing, and
        an axial auxiliary bearing comprising a lower auxiliary bearing part and an upper auxiliary bearing part, the upper auxiliary bearing part being configured to rotate about the axis of rotation relative to the lower auxiliary bearing part and to indirectly or directly contact the gear housing;
    a main spindle mounted so as to rotate about the axis of rotation within the gear unit, the main spindle being configured to indirectly or directly contact the upper main bearing part,
    wherein,
    the drill string is arranged to couple to the main spindle, and the lower auxiliary bearing part is configured to indirectly or directly contact the main spindle; and
    an active pressure generating device arranged between the upper auxiliary bearing part and the gear housing so as to act on the upper auxiliary bearing part from above.

2. The top drive as recited in claim 1, wherein the active pressure generating device comprises a piston which is configured to be activated with a hydraulic pressure or with a pneumatic pressure.

3. The top drive as recited in claim 2, wherein the piston is an annular piston which acts on the upper auxiliary bearing part.

4. The top drive according to claim 2, wherein the piston is provided as a plurality of cylindrical pistons which act upon the upper auxiliary bearing part.

5. The top drive as recited in claim 1, wherein the active pressure generating device comprises a mechanically acting spindle.

6. The top drive as recited in claim 1, further comprising a pressure control device configured to change a pressure created by the active pressure generating device during an operation of the top drive.

7. The top drive as recited in claim 1, further comprising:
a pressure control device configured to regulate or control a pressure generated by the active pressure generating device depending on an operating variable.

8. The top drive as recited in claim 7, wherein the operating variable is at least one of,
a force acting on the main spindle in a direction of the axis of rotation,
a speed of rotation with which the main spindle is operated, and
a rotational torque transferred via the main spindle.

\* \* \* \* \*